United States Patent
Holly et al.

(10) Patent No.: US 7,229,130 B1
(45) Date of Patent: Jun. 12, 2007

(54) VEHICLE HITCH ADAPTOR AND SEAT ASSEMBLY

(75) Inventors: Alan Conrad Holly, Minden, NV (US); Wesley Gene Wegner, Thousand Oaks, CA (US)

(73) Assignee: Ladeen Wilson Wegner, Thousand Oaks, CA (US)

( * ) Notice: Subject to any disclaimer, the term of this patent is extended or adjusted under 35 U.S.C. 154(b) by 457 days.

(21) Appl. No.: 10/979,835

(22) Filed: Nov. 2, 2004

Related U.S. Application Data (63) Continuation-in-part of application No. 10/264,401, filed on Oct. 4, 2002, now Pat. No. 6,908,150.

(60) Provisional application No. 60/517,122, filed on Nov. 3, 2003, provisional application No. 60/380,239, filed on May 13, 2002.

(51) Int. Cl.
*B60R 9/06* (2006.01)
(52) U.S. Cl. ............... 297/217.1; 297/463.1; 108/44; 224/520; 280/491.5
(58) Field of Classification Search ............ 297/217.1, 297/217.7, 463.1, 463.2; 108/44; 414/462; 224/519, 520, 521; 280/415.1, 416.3, 491.5
See application file for complete search history.

(56) References Cited

U.S. PATENT DOCUMENTS

| | | | |
|---|---|---|---|
| 3,159,368 A * | 12/1964 | Ahlbin et al. ......... 248/222.41 |
| 3,796,333 A * | 3/1974 | Goldstein ................. 224/520 |
| 3,805,984 A * | 4/1974 | Schwarz et al. ............ 414/462 |
| 3,858,775 A * | 1/1975 | Haas ......................... 224/520 |
| 4,412,635 A * | 11/1983 | Bateman ..................... 224/520 |
| 4,576,395 A * | 3/1986 | Longoria .................... 280/511 |
| 5,197,381 A | 3/1993 | Mells |
| 5,224,636 A | 7/1993 | Bounds |
| 5,397,147 A | 3/1995 | Ducharme et al. |
| 5,462,334 A | 10/1995 | Sedorcek et al. |
| 5,570,826 A | 11/1996 | Garbes et al. |
| 5,640,949 A | 6/1997 | Smith |
| 5,752,639 A * | 5/1998 | Rice ......................... 224/521 |
| 5,820,004 A * | 10/1998 | Lane ......................... 224/521 |
| 5,857,741 A | 1/1999 | Anderson |
| D414,949 S | 10/1999 | Natale |
| 5,971,464 A | 10/1999 | Davis et al. |
| 6,095,059 A | 8/2000 | Riley |
| 6,116,676 A | 9/2000 | Edwards |
| 6,189,458 B1 | 2/2001 | Rivera |
| 6,269,578 B1 | 8/2001 | Callegari |
| 6,314,891 B1 | 11/2001 | Larson |
| 6,336,413 B1 | 1/2002 | Ball |
| 6,467,417 B1 | 10/2002 | Guyot |
| 6,511,088 B2 | 1/2003 | Kahlstorf |
| 6,662,983 B2 | 12/2003 | Lane et al. |

* cited by examiner

*Primary Examiner*—Peter R. Brown
(74) *Attorney, Agent, or Firm*—Michael Blaine Brooks; Michael B. Brooks (57) ABSTRACT

Disclosed is a hitch adaptor adapted to engage a tow plate via a tow ball skirt or base, a tow ball shaft or fastener and a nut or locking device and adapted to receive support structures such as stanchions having deployable panels as seats.

12 Claims, 12 Drawing Sheets

VEHICLE HITCH ADAPTOR AND SEAT ASSEMBLY

CROSS REFERENCE TO RELATED APPLICATIONS

This application claims the benefit of U.S. Provisional Patent Application Ser. No. 60/517,122, of Wesley Gene Wegner and Alan Conrad Holly entitled, "Vehicle Hitch Seat Adaptor," filed Nov. 3, 2003, and this application is a continuation-in-part of application Ser. No. 10/264,401 filed Oct. 4, 2002, which claims the benefit of provisional patent application Ser. No. 60/380,239, of Wesley Gene Wegner and Alan Conrad Holly entitled, "COLLAPSIBLE SEAT FOR ATTACHMENT TO A TRAILER HITCH OR SPORT UTILITY RACK," filed May 13, 2002, and all three applications are hereby incorporated by reference herein, in their entirety, for all purposes.

FIELD OF THE INVENTION

This invention generally relates to vehicle hitch attachments, and more particularly pertains to vehicle hitch tow adaptors and storable seating assemblies attachable via vehicle hitch adaptors.

BACKGROUND OF THE INVENTION

Sports enthusiasts such as skiers, surfers and bikers often prefer delaying their changing into appropriate sporting attire until their arrival at their particular sporting venue. Changing into appropriate footware such as biking shoes and skiing boots is especially difficult without a seat. Often the sports enthusiast tows sports equipment such as a boat on a trailer or a collapsible tent trailer. In launching the boat, having one or more seats adapted to be deployed as standing platforms during the launch keeps the person out of the water and out of the way of the towing vehicle during the launch phase. Accordingly, it is desirable to have a utility seat that attaches to a receiver hitch via an adaptor that is detachably engaged via a tow ball of the ball plate assembly.

SUMMARY

A vehicle hitch adaptor having a sleeve for receiving a hitch plate and with the securing of the plate and adaptor by a tow ball with an integral screw or bolt causing the vehicle hitch adaptor to be detachably attached to the hitch plate. The adaptor is adapted to receive and securely position one or more stanchions without impinging the rotation of the towed member about the tow bar.

The ball hitch adaptor includes an adapting sleeve having a first side, a second side, a top side and a bottom side, a front aperture, a back aperture, wherein the top side has an upper ball shaft aperture, preferably smaller in diameter than the skirt of the tow ball, and a hitch plate aperture, and the bottom side has a lower ball shaft aperture preferably smaller than the nut associated with the threaded portion of the ball shaft or bolt, a first mounting sleeve fixedly attached on the first side of the adapting sleeve adapted to receive a first horizontal support member such as a stanchion, and a second mounting sleeve fixedly attached to second side of the adapting sleeve adapted to receive a second support member such as a stanchion. Preferably, the adaptor has a stiffening member fixedly attached to an outer portion of the bottom side of the adapting sleeve and fixedly attached to the first mounting sleeve and the second mounting sleeve and stabilizing members, such as bolts, adapted to project from an inner portion of the first side of the adapting sleeve. In some embodiments, the first and second mounting sleeves receive the first and second stanchions via their respective apertures and detachably secure the first and second stanchions via engaging members, such as spring-loaded plungers, projecting into the first aperture.

Further, a folding seat assembly for use in combination with a vehicle hitch tow plate, the folding seat assembly includes the adapting member embodiments of the present invention that are adapted to be mounted to the vehicle hitch tow plate and further include a first stanchion, adapted to adjustably attach to the adapting member at the first mounting sleeve and a first support member adapted to attach to the first stanchion and a first panel member adapted to rotatably attach to the first support member wherein the first panel is adapted to rotate upward, in a direction of the tow plate, into a substantially vertical position and to rotate downward, in a direction away from the tow plate, into a substantially horizontal position. In addition, the folding seat assembly may further include a second stanchion, adapted to adjustably attach to the adapting member at the second mounting sleeve; and a second support member adapted to attach to the second stanchion and a second panel member adapted to rotatably attach to the second support member wherein the second panel is adapted to rotate upward, in a direction of the tow plate, into a substantially vertical position and to rotate downward, in a direction away from the tow plate, into a substantially horizontal position.

BRIEF DESCRIPTION OF THE DRAWINGS

The present invention is illustrated by way of example and not limitation in the figures of the accompanying drawings, and in which.

DETAILED DESCRIPTION OF THE INVENTION

Figure 1:
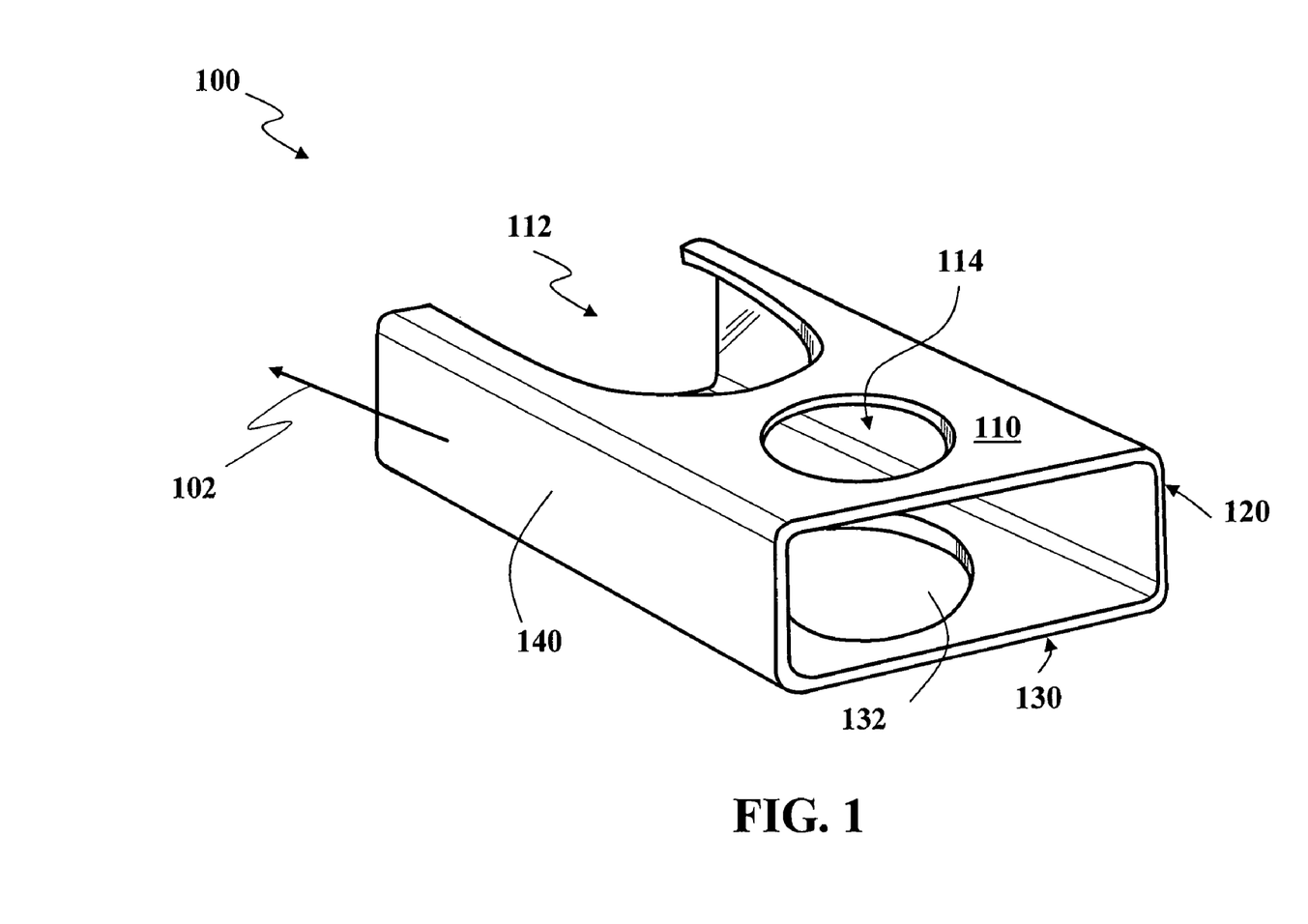
FIG. 1 is a perspective view of an example of the base element of the hitch plate adaptor.

FIG. 1 is a perspective view of an example base element 100 of the hitch plate adaptor having a first side or wall 140, a second side or wall 120, a top side or top wall 110 and a bottom side or bottom wall 130 wherein the top side has a top ball bolt aperture 114, a bottom ball bolt aperture 132 and an aperture for insertion of the hitch 112. The preferred direction of insertion 102 about the distal end of a ball mounting place is in the direction toward the hitching assembly (not shown).

Figure 2:
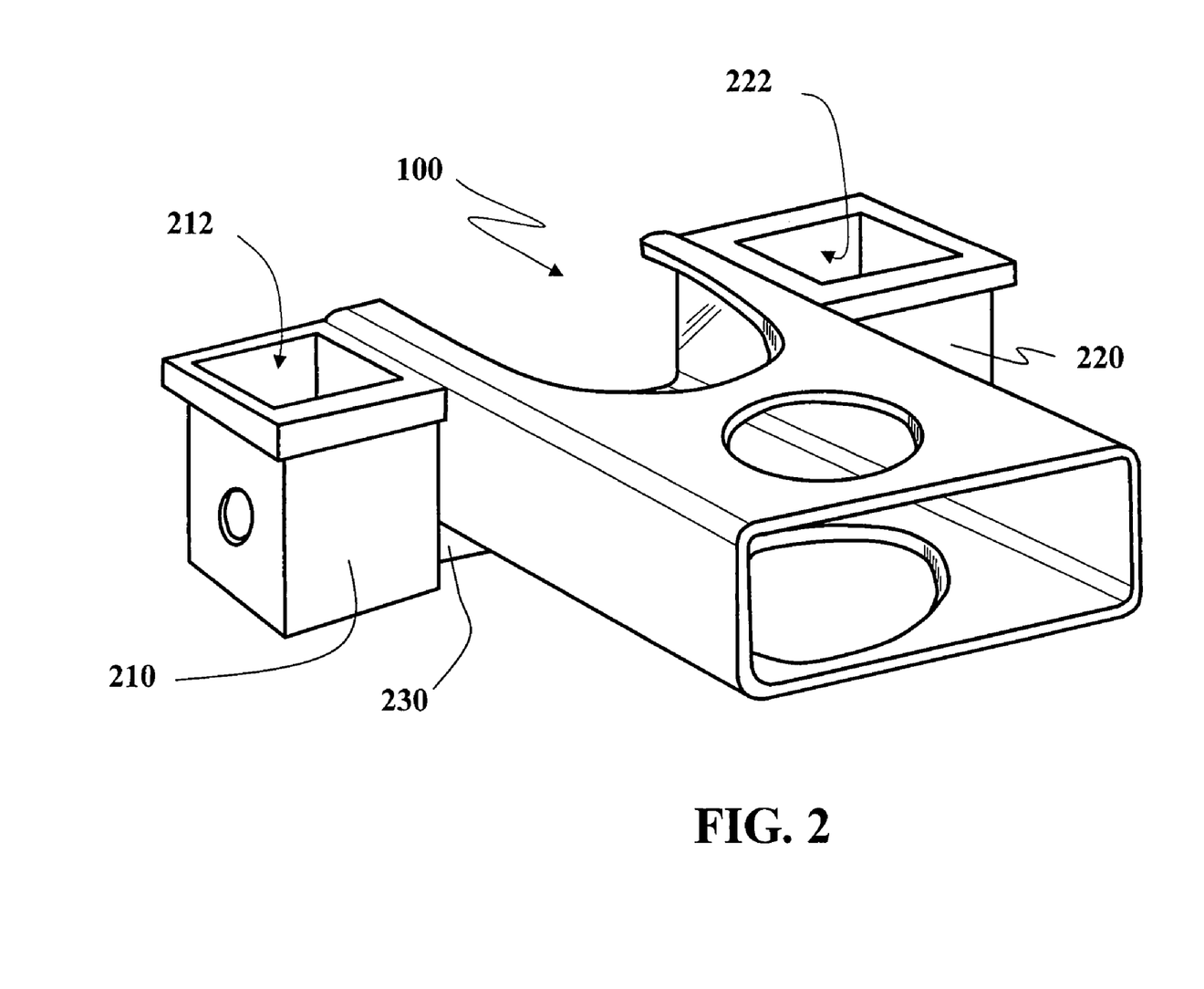
FIG. 2 is a perspective view of the example of the base element having seat sleeves attached.

The base element 100 or adapting member or ball plate mounting sleeve provides for that detachable attachment of the fixtures. FIG. 2 is a perspective view of the example base element 100 having an example first sleeve 210, or seat mounting sleeve, attached to the first side 140 and an example second sleeve 220 attached to the second side 120. Preferably the example first sleeve 210 and the example second sleeve 220 are welded to the base element 100, and in other embodiments, the sleeves 210, 220 may be cast with the base element 100 or fastened to the base element 100. The first sleeve 210 preferably has inner surfaces 212 forming a first sleeve aperture and the second sleeve 220 preferably has inner surfaces 222 forming a second sleeve aperture. The components of the basic element 100 and the first sleeve 210 and second sleeve 220 are preferably made of steel. A stiffening member 230 is preferably attached to both of the sleeves and the adapting member bottom side 130.

Figure 3:
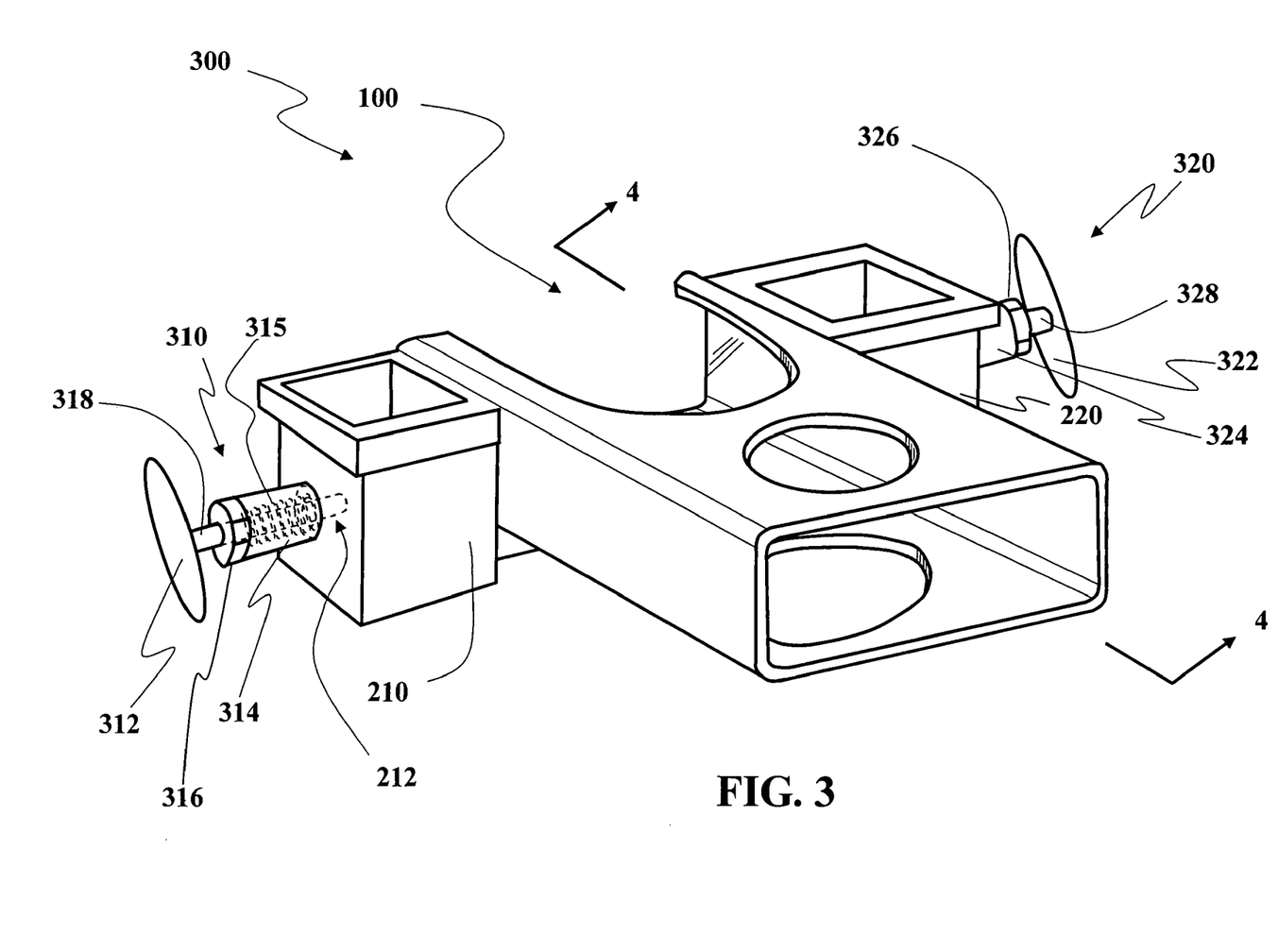
FIG. 3 is a perspective view of the example of the base element having seat sleeves with spring-loaded plungers attached.

The sleeves 210, 220 are adapted to receive members. In order to detachably attach and otherwise secure the received member, preferably pins are used to extend from each of the sleeves 210, 220 to engage each respective member being received by the particular sleeve. FIG. 3 is a perspective view of an example adaptor 300 including the base element 100 having sleeves with a first, preferably spring-loaded, plunger 310 fixedly attached to the first sleeve 210 and a second, preferably spring-loaded plunger 320 fixedly attached to the second sleeve 220. Within a first spring housing 314, the first spring 315 is connected to the first pen or shaft 318 and further enclosed by a fixture 315 and an outer wall of first sleeve where the pen penetrates the outer wall to enter the aperture of the first sleeve 210. By pulling on a handle 312 of a plunger, a pin 318, for example, may be withdrawn from the aperture of the sleeve and when the handle is released, the force of the spring in compression causes the previously retracted pen to engage the member within the aperture of the sleeve.

Figure 4:
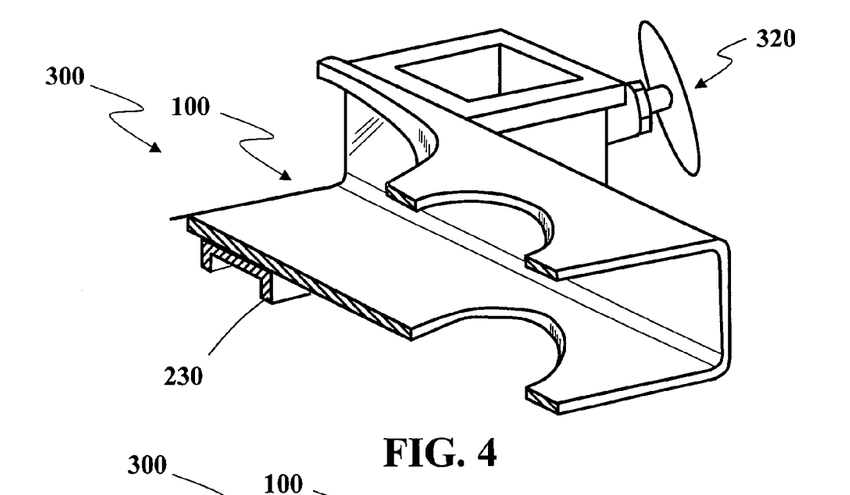
FIG. 4 is a longitudinal cut view of the example adaptor in perspective showing the stiffening member in transverse.
Figure 5:
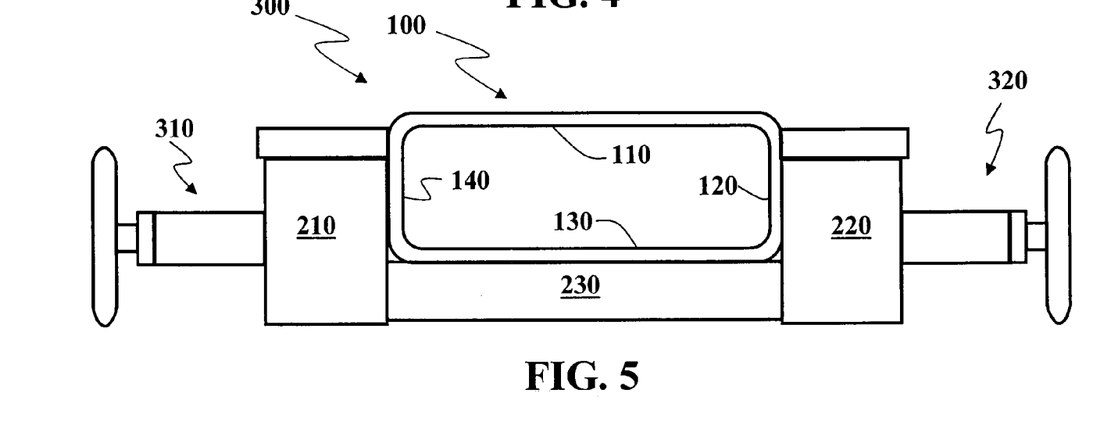
FIG. 5 is a front view of an example of the adaptor.
Figure 6:
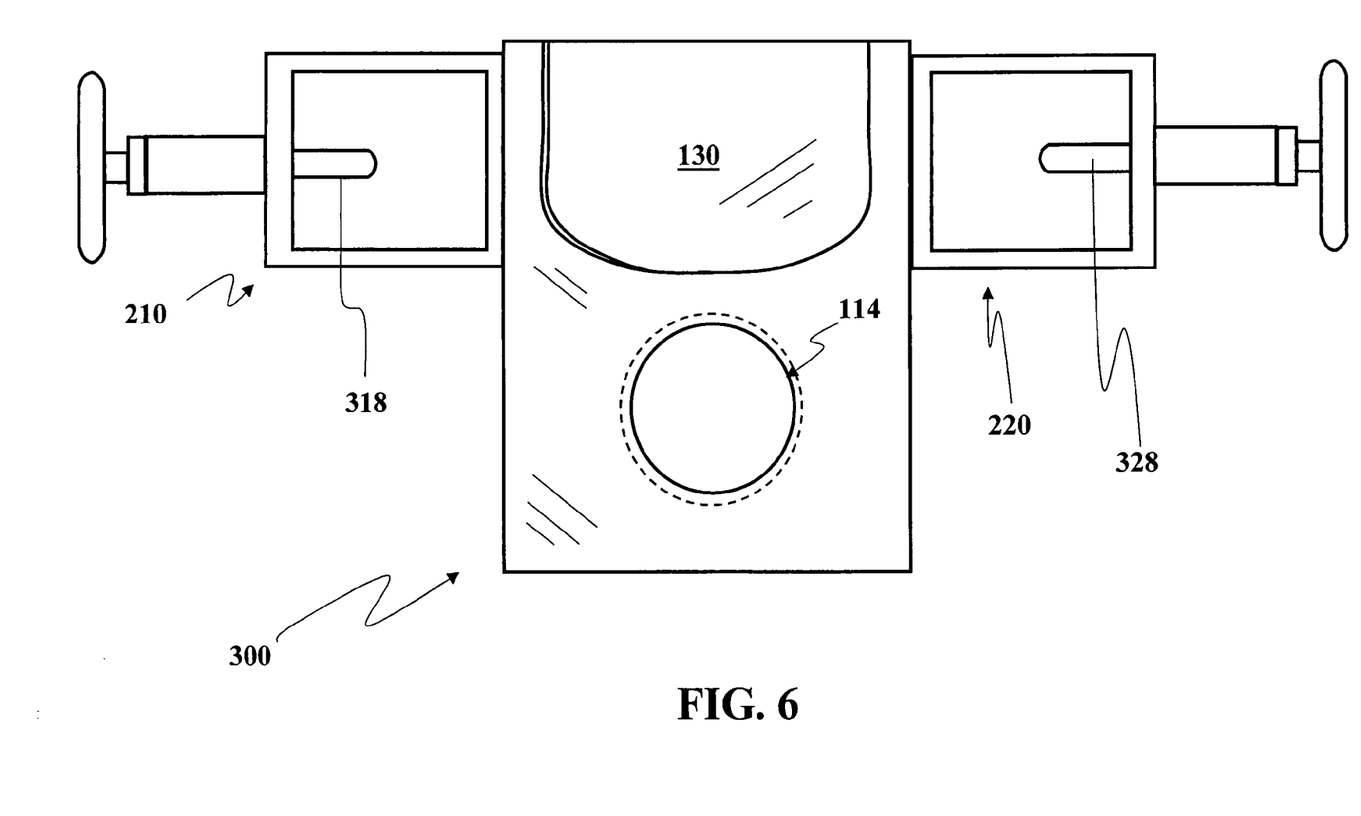
FIG. 6 is a top view of the example adaptor.

Preferably, a stiffing member is used to increase structural stability between two sleeves 210, 220. FIG. 4 is a longitudinal cut view in perspective showing an example of the stiffening member 230 in transverse. FIG. 5 is a front view of an example of the adaptor where the stiffing member 230 can be seen traversing the width of the base member 100. FIG. 6 is a top view of the example adaptor 300 illustrating a first pin 318 within the aperture of the first sleeve 210 and a second pin 328 within the aperture of the second sleeve 220.

Figure 7:
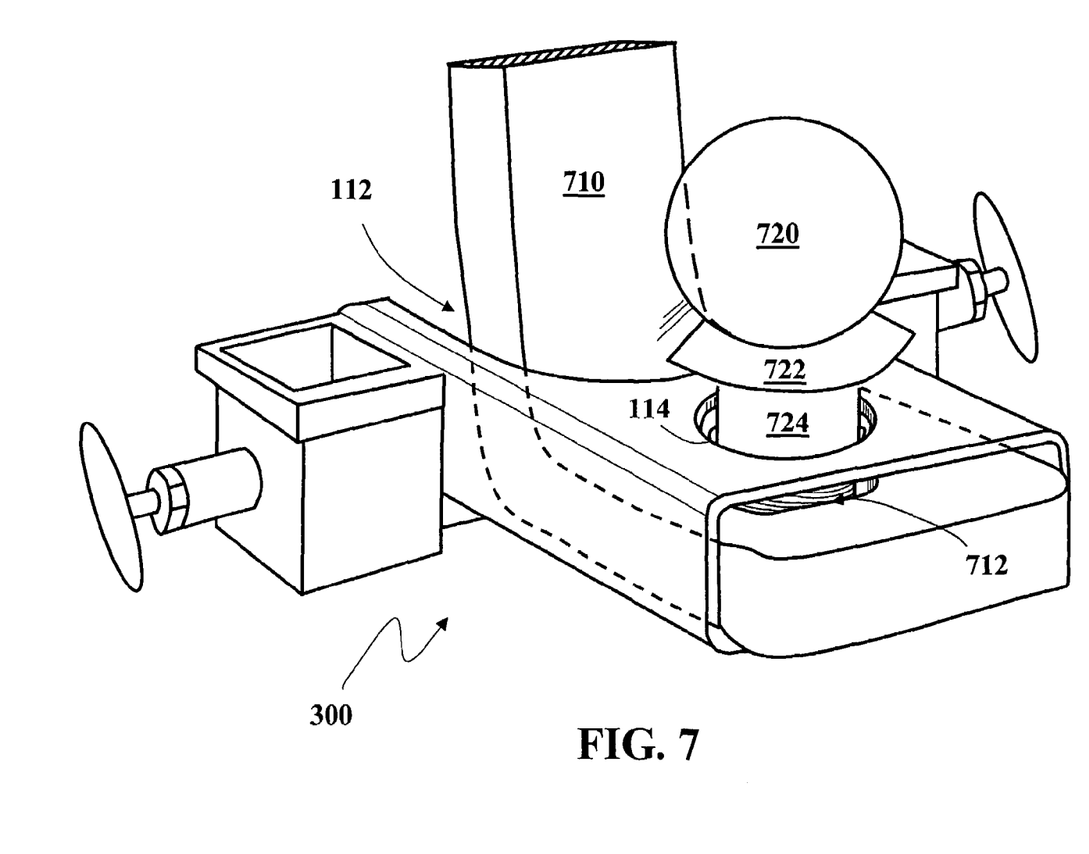
FIG. 7 is a perspective view illustrating both a ball plate and a ball having a post and a skirt engaging the example adaptor.

FIG. 7 is a perspective view illustrating both a ball plate 710 that may be extending from a hitch assembly (not shown) engaging the example adaptor 300 at the aperture for insertion 112 and a ball 720, as an example of a tow pivot point member, with a skirt 722 as an example of a base, and post 724, as an example of a pivot point member fastener, engaging the adaptor 300 at the top ball bolt aperture 114 and the bottom ball bolt aperture 132 via an aperture 712 of the ball plate 710. Preferably, the skirt 722 is brought into contact with the top wall 110 of the base member 100 to secure the ball 720 to the adaptor 300.

Figure 8:
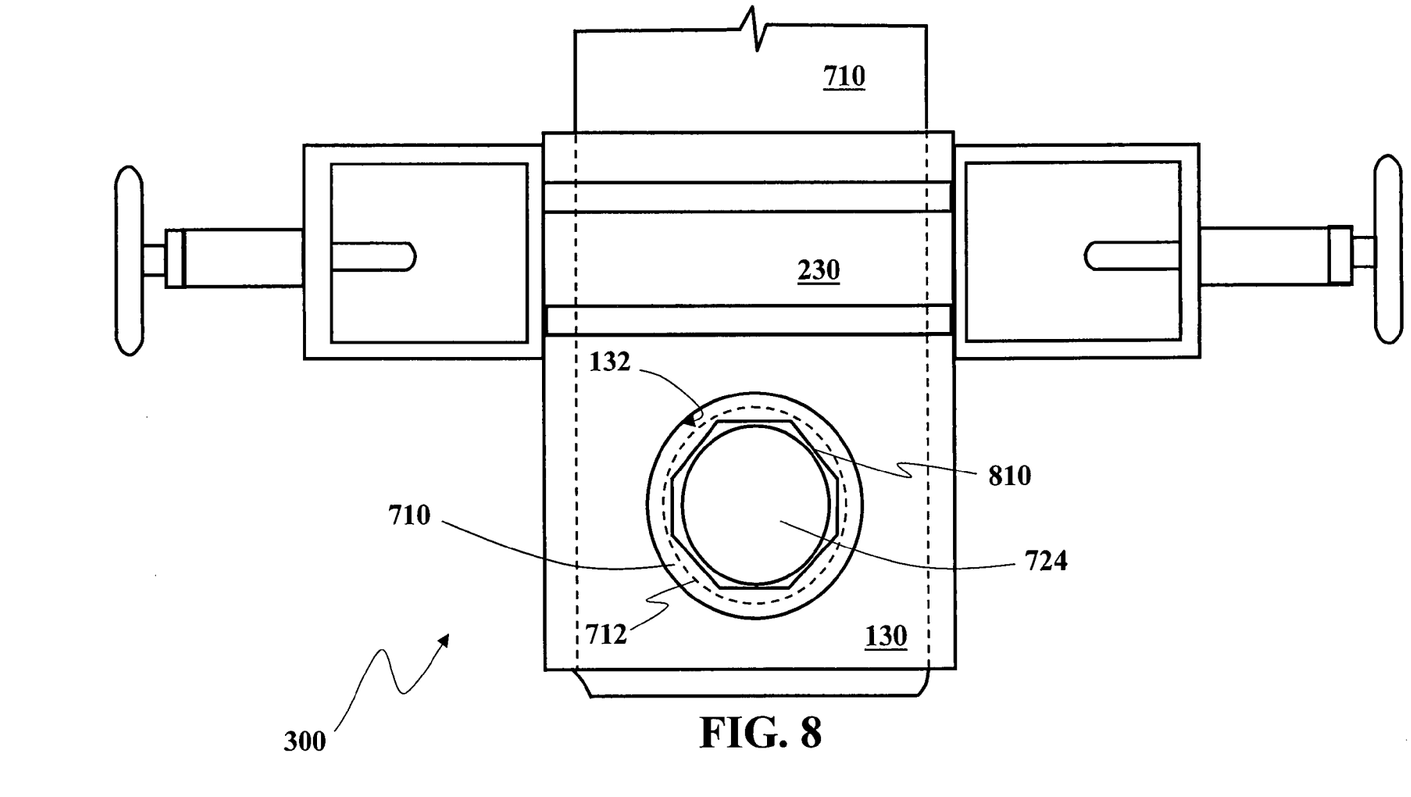
FIG. 8 is a bottom view of the example adaptor illustrating the use of a nut to secure the ball post and thereby secure the adaptor to the ball plate.

FIG. 8 is a bottom view of the adaptor 300 illustrating the use of a nut 810, as an example of a pivot point member locking device, brought into contact with the ball plate about the ball plate aperture 712, to secure the ball post 724, via the bottom bolt aperture 132, and thereby secure the adaptor 300 to the ball plate 710.

Figure 9:
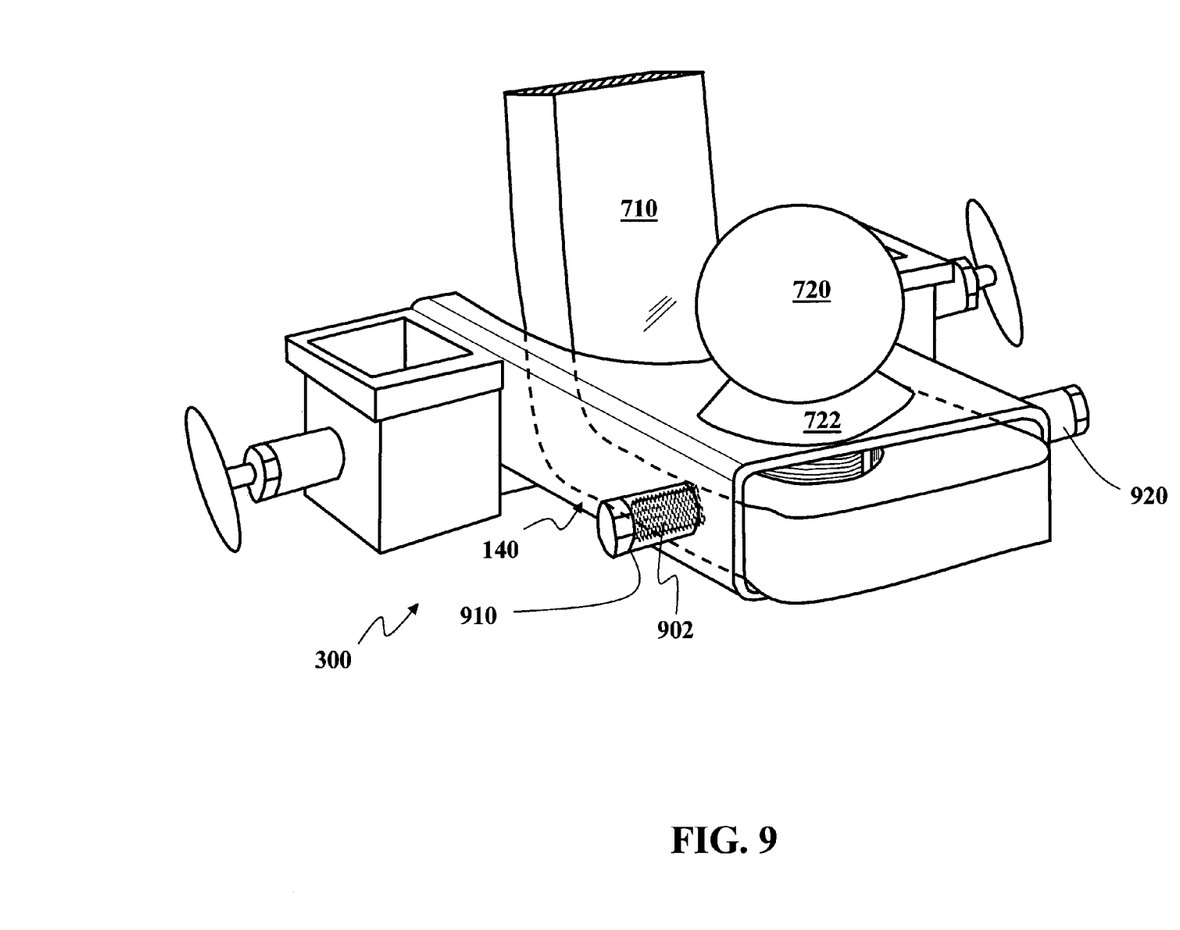
FIG. 9 is a perspective view illustrating both a ball plate and a ball with skirt and post engaging the adaptor and lateral stability bolts.
Figure 10:
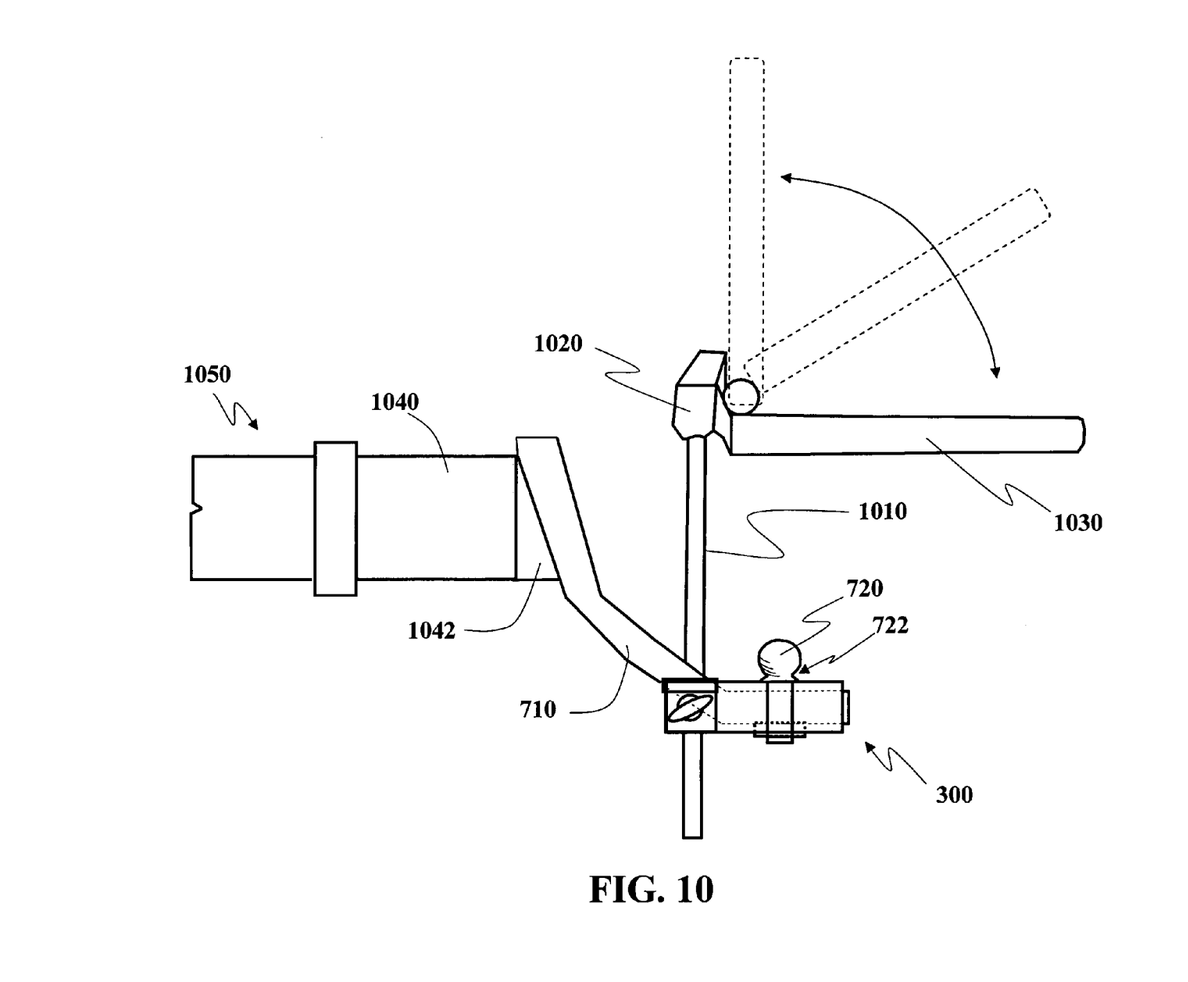
FIG. 10 is a side view of the adaptor and ball mounting plate having an example rotatable panel detachably attached via a stanchion.
Figure 11:
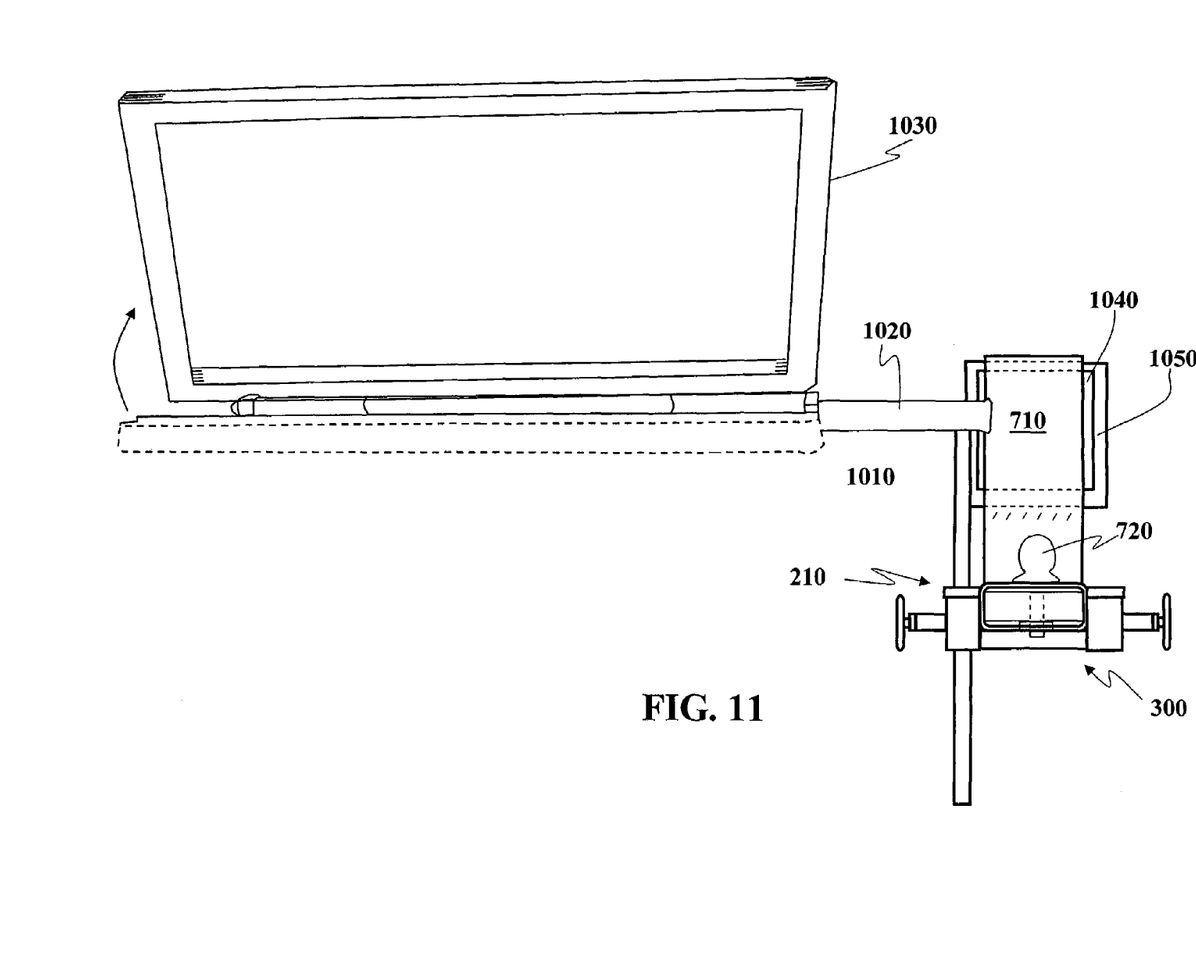
FIG. 11 is a front view of the adaptor and ball mounting plate having an example rotatable panel detachably attached via a stanchion.
Figure 12:
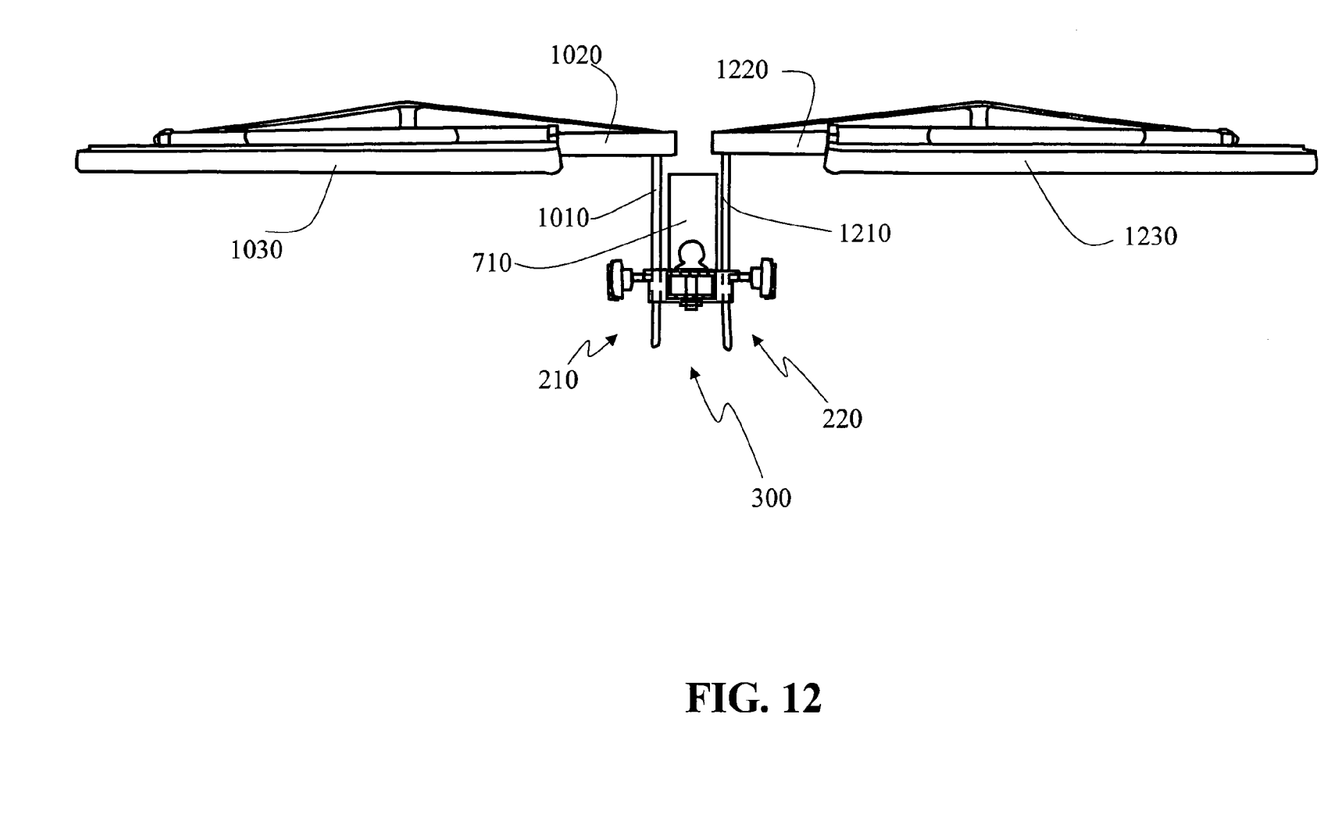
FIG. 12 is a front view of the adaptor and ball mounting plate with two example panels attached to the example adaptor.
Figure 13:
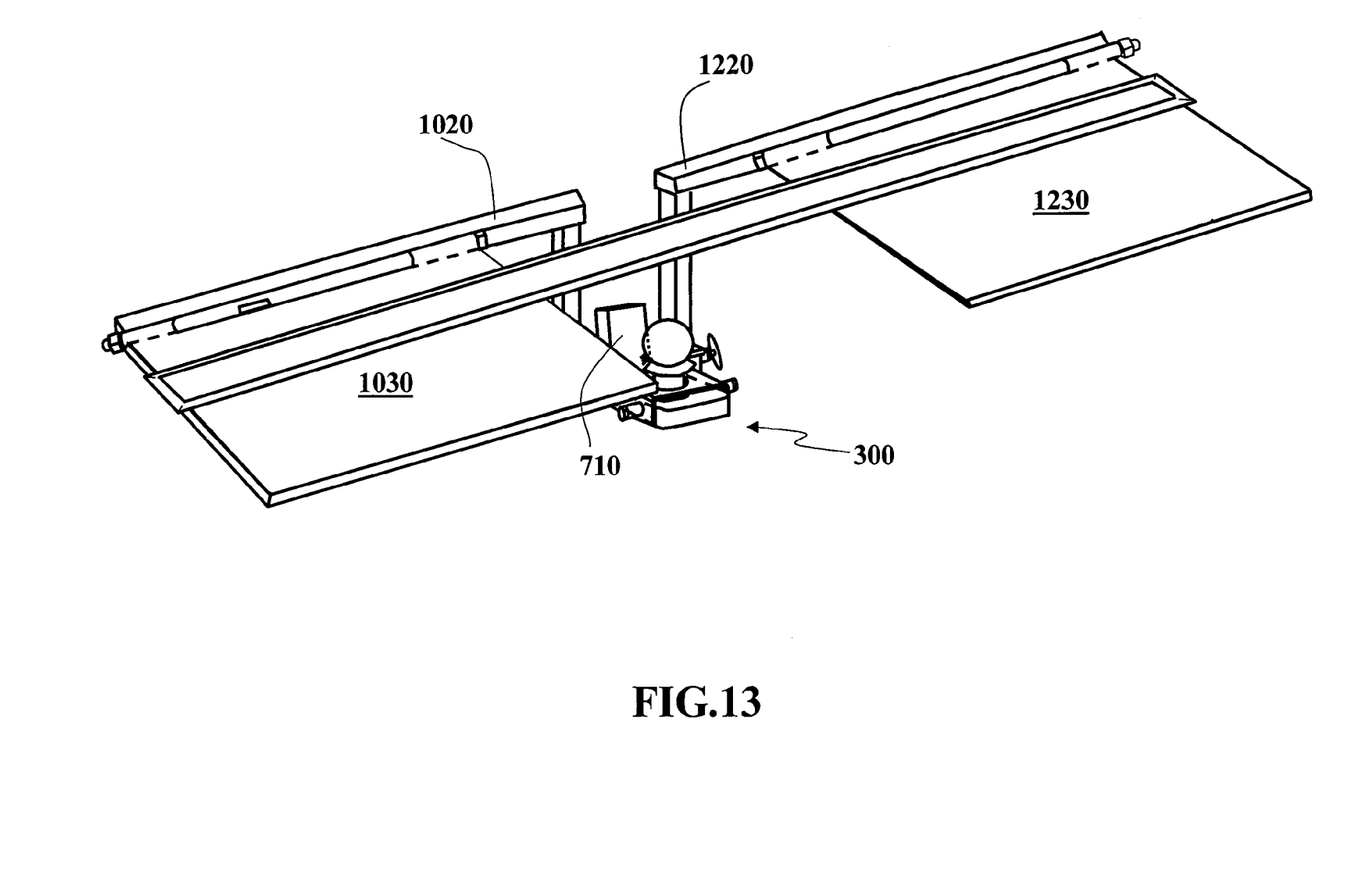
FIG. 13 illustrates a perspective view of the adaptor and ball mounting plate with an exemplary motorcycle mounting platform detachably attached across example seats.

FIG. 9 is a perspective view illustrating a ball plate 710 having ball 720 with skirt 722 engaging the adaptor 300 and a first lateral stability bolt 902 and housing 910 fixedly attached to the first wall 140 and a second lateral stability bolt and housing 920 fixedly attached to the second wall 120. FIG. 10 is a side view of the adaptor 300 and ball mounting plate 710. A first stanchion 1010 is shown inserted into the first sleeve 210. The first qstanchion 1010 supports a first member 1020 hinged or rotatably attached to a second member 1030. The second member 1030 may be a seat panel for example. The ball mounting plate 710 is attached to an insertion member 1040 which may be structurally reinforced with a support member 1042. The insertion member 1040 is adapted to inset into a receptacle 1050, a trailer hitch receptacle for example. When a hitching assembly having a receptacle 1050 is mounted to a vehicle, the second member 1050 is rotated upward toward the vehicle into a substantially vertical position and rotated downward in a direction away from the vehicle into a substantially horizontal position. FIG. 11 is a front view of the adaptor 300 and ball mounting plate 710. In this view, the seat panel 1030 is rotated from a substantially horizontal position to a substantially vertical position. FIG. 12 is a front view of the adaptor 300 and ball mounting plate 710 where the first stanchion 1010 is shown inserted into the first sleeve 210 thereby supporting the first member 1020 hinged or rotatably attached to a second member 1030. Also shown is a second stanchion 1210 inserted into the first sleeve 220 thereby supporting the first right member 1220 hinged or rotatably attached to a second right member 1230. The second right member 1230 may be a seat panel for example. FIG. 13 illustrates a perspective view of the adaptor 300 and a portion ball mounting plate 710 with an example motorcycle mounting platform 1300 across example seats or panels 1030, 1230 in deployed or substantially horizontal positions.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims.

The words used in this specification to describe the several embodiments of the present invention are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include that which is specifically illustrated and described above; that which is conceptually equivalent, that which can be obviously substituted and that which incorporates the essential idea of the invention as disclosed by its several embodiments.

We claim:

1. A hitch adaptor comprising;
an adapting sleeve having a first side, a second side, a top side and a bottom side, a front aperture, a back aperture, wherein the top side has an upper ball shaft aperture and a hitch plate aperture, and the bottom side has a lower ball shaft aperture;
a first mounting sleeve fixedly attached on the first side of the adapting sleeve adapted to receive a first substantially vertical support member; and
a second mounting sleeve fixedly attached to second side of the adapting sleeve adapted to receive a second substantially vertical support member.

2. The hitch adaptor of claim 1 further comprising a stiffening member fixedly attached to an outer portion of the bottom side of the adapting sleeve and fixedly attached to the first mounting sleeve and the second mounting sleeve.

3. The hitch adaptor of claim 1 further comprising a first stabilizing member adapted to project from an inner portion of the first side of the adapting sleeve.

4. The ball hitch adaptor of claim 3 further comprising a second stabilizing member adapted to project from an inner portion of the second side of the adapting sleeve.

5. The hitch adaptor of claim 1 wherein the first mounting sleeve receives the first substantially vertical support member via a first aperture and detachably secures the first substantially vertical support member via an engaging member projecting into the first aperture.

6. The hitch adaptor of claim 5 wherein the first substantially vertical support member is a first stanchion.

7. The hitch adaptor of claim 1 wherein the second mounting sleeve receives the second substantially vertical support member via a second aperture and detachably secures the second substantially vertical support member via an engaging member projecting into the second aperture.

8. The hitch adaptor of claim 7 wherein the first substantially vertical support member is a second stanchion.

9. The hitch adaptor of claim 1 wherein the upper ball shaft aperture having a diameter is adapted to engage a tow ball having a height maintaining portion larger in diameter than the upper ball shaft aperture diameter.

10. The hitch adaptor of claim 1 wherein the lower ball shaft aperture having a diameter is adapted to permit the translation of a ball shaft nut having a diameter less than the lower ball shaft aperture diameter.

11. A folding seat assembly for use in combination with a vehicle hitch tow plate, the folding seat assembly comprising:
an adapting member, adapted to be mounted to the vehicle hitch tow plate comprising:
an adapting sleeve having a first side, a second side, a top side and a bottom side, a front aperture, a back aperture, wherein the top side has an upper ball shaft aperture and a hitch plate aperture, and the bottom side has a lower ball shaft aperture;
a first mounting sleeve fixedly attached on the first side of the adapting sleeve adapted to receive a first stanchion; and
a second mounting sleeve fixedly attached to second side of the adapting sleeve adapted to receive a second stanchion; and
a first stanchion, adapted to adjustably attach to the adapting member at the first mounting sleeve; and
a first support member adapted to attach to the first stanchion and
a first panel member adapted to rotatably attach to the first support member wherein the first panel is adapted to rotate upward, in a direction of the tow plate, into a substantially vertical position and to rotate downward, in a direction away from the tow plate, into a substantially horizontal position.

12. The folding seat assembly of claim 11 further comprising:
a second stanchion, adapted to adjustably attach to the adapting member at the second mounting sleeve; and
a second support member adapted to attach to the second stanchion and
a second panel member adapted to rotatably attach to the second support member wherein the second panel is adapted to rotate upward, in a direction of the tow plate, into a substantially vertical position and to rotate downward, in a direction away from the tow plate, into a substantially horizontal position.

* * * * *